May 8, 1928.
J. B. GABRIELSON
1,669,332
VEHICLE SIGNAL
Filed July 27, 1922
2 Sheets-Sheet 1
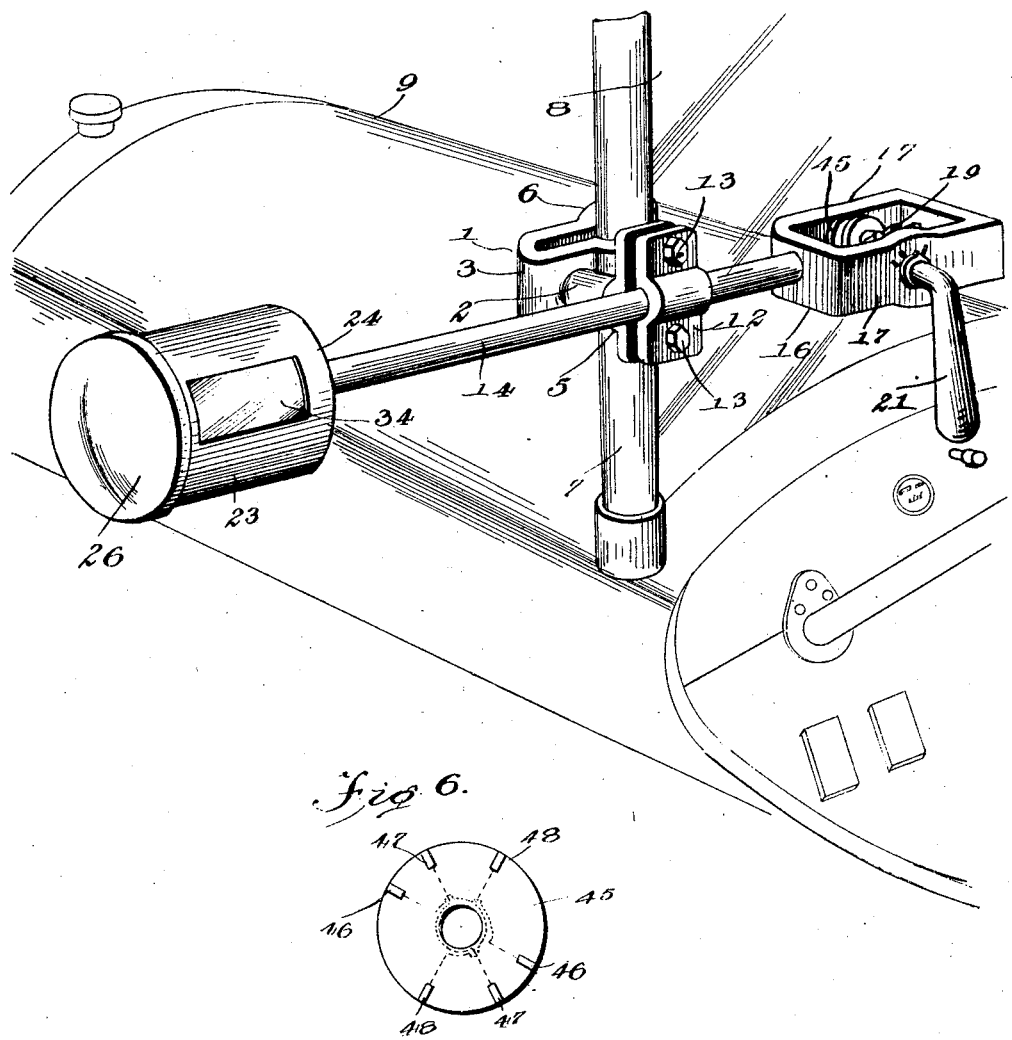
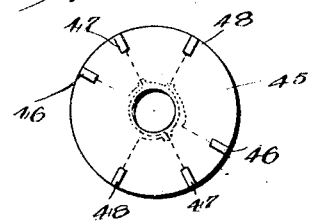
WITNESSES
INVENTOR
J. B. Gabrielson,
BY
ATTORNEYS May 8, 1928.
J. B. GABRIELSON
VEHICLE SIGNAL
Filed July 27, 1922
1,669,332
2 Sheets-Sheet 2
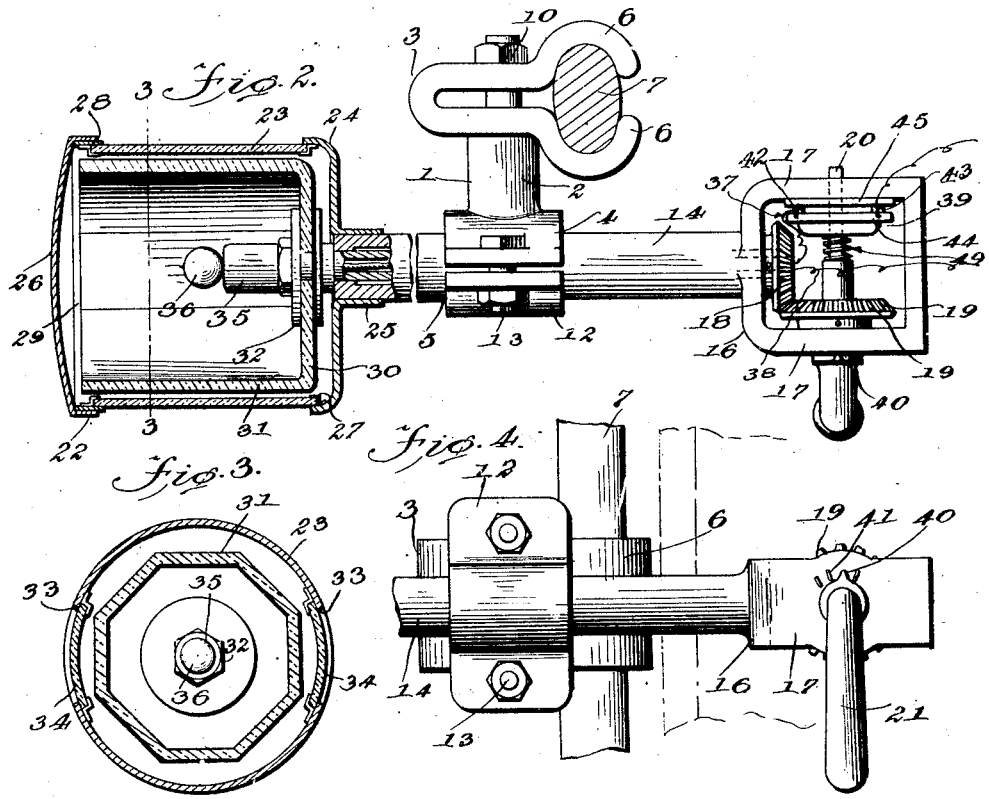
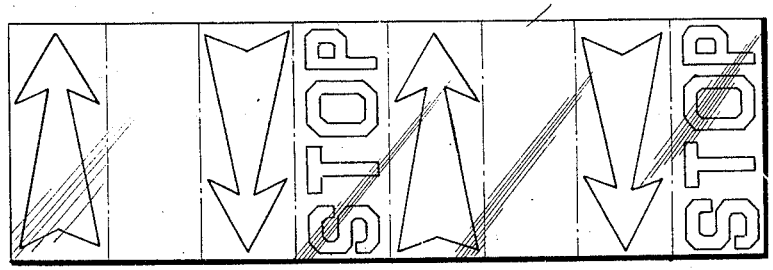
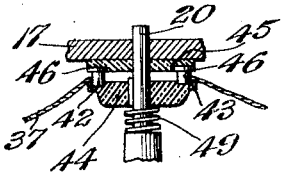
WITNESSES
INVENTOR
J. B. Gabrielson,
BY
ATTORNEYS Patented May 8, 1928.

1,669,332

UNITED STATES PATENT OFFICE.

JACOB B. GABRIELSON, OF LA CENTER, WASHINGTON.

VEHICLE SIGNAL.

Application filed July 27, 1922. Serial No. 577,785.

My invention relates to improvements in vehicle signals, particularly signals designed for attachment to automotive vehicles, and it consists in the combinations, constructions and arrangements herein described and claimed.

An object of the invention is to provide a relatively simple and durable signal device which is adapted to be attached to a windshield frame of an automobile or like support to extend laterally of the body of the automobile, and which can be operated conveniently and easily by the driver of the automobile to indicate to interested persons the direction the automobile is about to take or the fact that the automobile is about to stop.

A further object of the invention is to provide a signal device of the character described which has means for displaying desired signals to observers at both the rear and the front of the vehicle to which the device is applied and which has means actuated coincidently with the giving of the desired signals to draw the attention of observers to such signals.

Other objects and advantages will be apparent from the following description, and the novel features of the invention will be particularly outlined in the appended claims.

My invention is illustrated in the accompanying drawings, forming a part of this application, in which Figure 1 is a fragmentary perspective view, showing the front portion of an automobile equipped with a practical embodiment of the invention, Figure 2 is a horizontal section through the embodiment of the invention shown in Figure 1 and through the support therefor, Figure 3 is a section through the signal casing comprised in the device substantially along the line 3—3 of Figure 2, Figure 4 is a side elevation of a fragmentary portion of the structure shown in Figure 2.

Figure 5 is a view showing in developed form a signal bearing casing comprised in the device, Figure 6 is a detail view of a switch mechanism adapted to be embodied in the device, and Figure 7 is a fragmentary sectional view of the electric switch mechanism.

The supporting structure comprised in a practical embodiment of the invention includes a bracket 1 consisting of a relatively short longitudinal body 2 formed integrally with a clamp 3 at one end thereof and being also integral with a section 4 of a clamp 5 at the other end thereof. The clamp 3 comprises a pair of spring arms extending substantially at right angles to the longitudinal axis of the body 2 and having cooperating spring jaws 6—6 at their ends, the spring jaws 6—6 being adapted to clampingly embrace an upright support 7 which may be one of the side members of the frame for the windshield 8 of an automobile, such as that illustrated clearly at 9 in Figure 1. The jaws 6—6 are releasably held clamped at opposite sides of the support 7 by means of a nut 10 in threaded engagement with the end portion of an axial relatively reduced extension 11 to the body 2. The axial extension 11 extends through the adjacent arm of the clamp 3 and then loosely through an opening in the arm of the clamp 3 remote from the body 2.

The clamp 5 includes in addition to the clamp section 4 a second section 12 which is complemental to the section 4 and is adjustably connected with the latter by means of bolt and nut devices, such as indicated at 13 or the like to releasably support between the sections 4 and 12 a tubular housing 14 in which a hollow shaft 15 is journaled. The axis of the clamp 5 extends substantially at right angles to the axis of the body 2 and therefore substantially parallel with the arms of the clamp 3. The tubular housing 14 is provided at one end with a yoke having a pair of spaced apart parallel arms or branches 17 extending in parallel relation to the longitudinal axis of the hollow shaft 15 at opposite sides thereof and equi-distantly therefrom. A bevel gear 18 is secured to the end of the hollow shaft 15 which protrudes from the housing 14 into the yoke 16. A bevel gear 19 secured to a shaft 20 which is journaled adjacent to its ends in the arms 17, 17 and extends transversely of the yoke is in mesh with the gear 18. The shaft 20 is provided at its one end with an operating handle 21. It will thus be apparent that when the operating handle 21 is grasped and manipulated to rotate the shaft 20 the hollow shaft 15 will be rotated in the housing 14.

A casing 22 which houses the signal giving elements of the device comprises a substantially cylindrical body 23 closed at one end by a cap 24 having a hub portion 25 mounted upon the tubular housing 14 at one end of the latter, and closed at its other end by a cap 26. A retaining ring 27 engaging the one end of the cylindrical body 23 and the inner wall of the cap 24 tends to hold the cap 24 and the body 23 in locked together relation. A second retaining ring 28 at the other end of the body 23 locks the latter to a reflector 29 which is received within the cap 26 and is also held in engagement with the body 23 at its one end by the cap 26.

The hollow shaft 15 extends at its end remote from the bevel gear 18 within the cylindrical body 23 along the axis of the latter and through the adjacent end 30 of an inner or signal casing 31 which is adapted to be disposed within the outer casing and which is open at its outer end. The inner or signal casing 31 is formed of any suitable translucent material, such as white or frosted glass and is preferably, although not necessarily, octagonal in cross sectional contour. The casing 31 is secured to the shaft 15 in any suitable manner, by means of a clamping arrangement such as indicated at 32 and including a member fixed on the shaft in abutting relation to the outer face of the end 30 and other members engaging the shaft within the casing for holding the end clamped against the fixed member and for permitting removal of the casing from the shaft, when required.

The opposite faces or portions of the inner or signal casing 31 are similar and similar signal indicia are provided on opposite faces or portions. For example, the signal casing now preferred by me and illustrated in the accompanying drawings has colored arrows pointing in one direction on two diametrically opposite faces, the diametrically opposite faces at one side of the faces provided with the arrows being left blank, the diametrically opposite faces next to the blank faces or portions being provided with arrows pointing oppositely to the first arrows, and the diametrically opposite faces between oppositely pointing arrows having the word "Stop" produced thereon. The marking of the signal casing is clearly shown in Figure 5.

The body 23 of the outer casing is provided with longitudinally extending openings 33—33 in opposite sides thereof in which are mounted transparent panels 34 which are preferably suitably formed to magnify to observers articles or objects disposed within the casing. The width of each of the openings 33 is approximately the same as the width of each of the faces or indicia bearing portions of the signal casing 31.

The hollow shaft 15 is provided at the end thereof which is positioned within the signal casing 31 with a socket 35 adapted to support an incandescent lamp 36. Conductors 37 and 38 respectively lead from the socket 35 through the tubular shaft 15 through the yoke 16 to any suitable source of electric current supply, the conductor 37 being broken by an electric switch 39 which is supported within the yoke 16 in association with the shaft 20 as will be understood from the following.

The operating handle 21 is provided with an index finger or pointer 40 cooperating with an arcuate series of index marks 41 produced upon the outer side of one of the arms or branches of the yoke 16, there being one of the marks 41 for each species of signal indicia produced upon the signal casing 31 and the respective marks 41 being spaced apart so that the signal casing 31 will be turned to present signal indicia of a particular species to view through the transparent panels 34—34 when the pointer 40 is in registration with the mark 41 representing that particular species of signal indicia. One of the marks 41 represents the blank spaces or portions of the signal casing and such blank faces or portions are in line with the transparent panels 34—34 when the index mark representing such blank faces is indicated by the pointer 40.

It is intended that the lamp 36 shall be energized only when the signal arrows or the word "Stop" are displayed to view through the transparent panels 34—34 and to this end the switch 39 may comprise any suitable cooperating elements adapted to be operated by the shaft 20 to establish an electrical connection between the broken ends of the conductor 37 when one of the species of signal giving indicia enumerated is displayed to view. In the present instance, the broken ends of the conductor 37 are operatively attached to a pair of spaced apart brushes 42 and 43 respectively which are carried on the face of a disk 44 which is made of a suitable insulating material and is feathered to the shaft 20. A cooperating stationary disk 45 secured in encircling relation to the shaft 20 is made of insulating material and has on the face thereof confronting the disk 44 three pairs of spaced apart connected together contacts such as indicated at 46, 47, and 48 respectively. An expansion spring 49 between the hub of the beveled gear 19 and the disk 44 holds the latter with the brushes 42 and 43 continuously in contact with the confronting face of the disk 45. Consequently, when the shaft 20 is rotated to position one of the species of signal giving indicia in line with the transparent panels 34—34, the brushes 42 and 43 will be in contact with the contacts of the pair of contacts representing that particular signal giving indicia and the lamp operating circuit, which is normally open will be closed and the lamp 36 thus energized. In other words, the pairs of contacts 46, 47 and 48 are co-related to the different species of signal giving indicia enumerated and to the marks 41 representing such signal giving indicia so that the lamp 36 is energized whenever one of the species of the signal giving indicia enumerated is positioned in line with the transparent panels 34—34 and the lamp 36 will be de-energized when the blank faces of the signal casing 31 are in line with the transparent panels 34—34.

The conductors 47 and 38 in the construction described will have sufficient slack therein to permit the rotation of the hollow shaft 15 required without twisting such conductors and placing such strain thereon as would tend to break them or detrimentally affect the operation of the device.

From the foregoing description of the various parts of the device, the operation thereof will be readily understood. The tubular housing 14 supported in the manner described will extend laterally of the body of the automobile 9 or of a like vehicle and the operating handle 21 will be positioned in front of the driver of the vehicle and can be conveniently grasped and manipulated by the driver without interfering with the operation of the automobile in the usual manner. The reflector 29 diffuses the rays of light from the lamp 36 throughout the signal casing 31 and projects such rays of light through the transparent panels 34—34. The device is simple in construction and can be attached to or detached from vehicles of ordinary construction or like vehicles. The signal giving means will be positively operated at the will of the operator of the vehicle to indicate his intentions in respect to the further operation of the vehicle.

Obviously, my invention is susceptible of embodiment in forms other than that illustrated herein, and I therefore consider as my own all modifications and adaptations of the forms of the device disclosed herein, which fairly fall within the scope of the appended claim.

I claim:—

In a support a pair of complementary clamps to embrace an object to be supported, a right angular extension projecting from one of the clamps and having a reduced extension at one end, a resilient U-shaped member removably received on the extension with one leg engaging the projection and terminating in coacting jaws to embrace a support disposed at right angles to the object to be supported, and a nut threaded on the extension for retaining the U-shaped member thereon and placing the latter under tension to draw the jaws into gripping engagement with such support.

JACOB B. GABRIELSON.